Oct. 12, 1948.                I. WOLFF                2,451,141
                        OBJECT DETECTING DEVICE
                         Filed Oct. 29, 1938
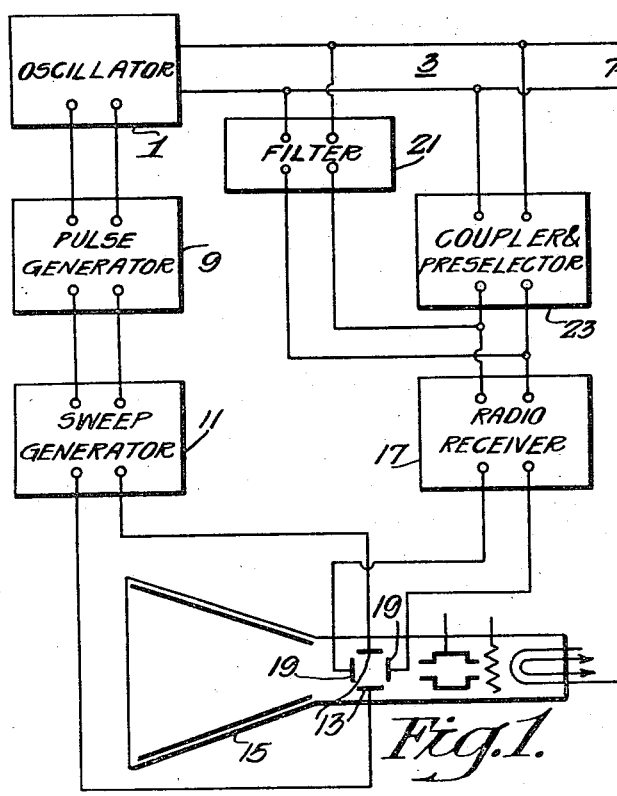
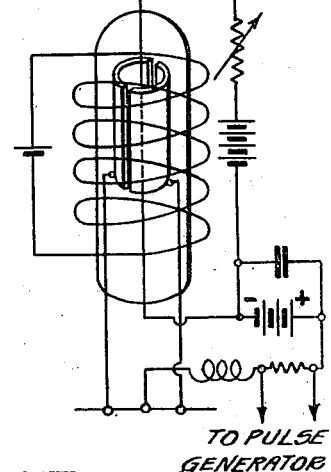
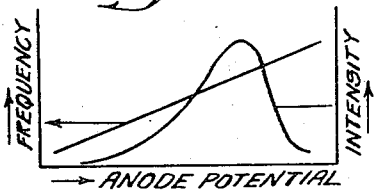
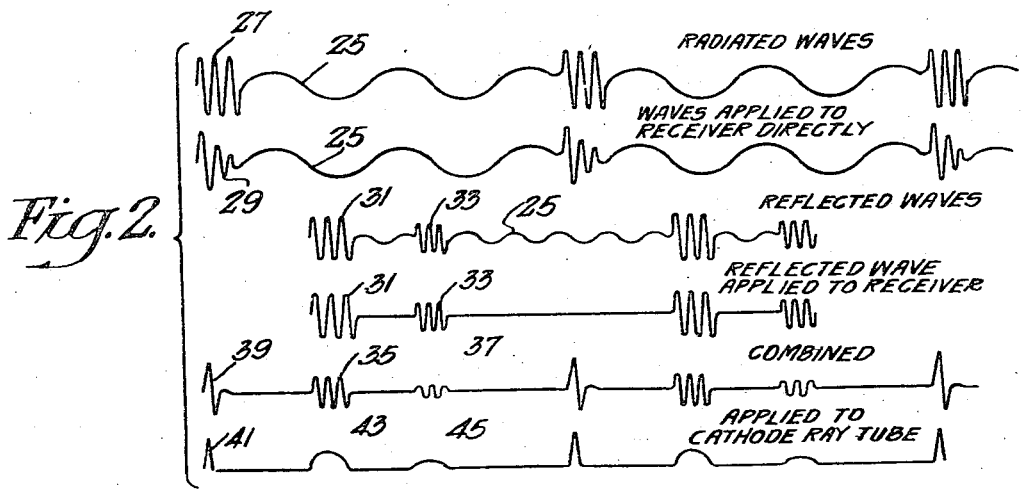
Inventor
Irving Wolff
By
Attorney Patented Oct. 12, 1948

2,451,141

UNITED STATES PATENT OFFICE 2,451,141

OBJECT DETECTING DEVICE

Irving Wolff, Merchantville, N. J., assignor to Radio Corporation of America, a corporation of Delaware Application October 29, 1938, Serial No. 237,606

2 Claims. (Cl. 343—13)

This invention relates to object detecting devices and more specifically to an object detecting device in which a carrier of relatively low amplitude is momentarily increased in amplitude and changed in frequency. The thus modulated carrier is radiated toward a distant object and directly applied to a radio receiver. The receiver is selectively responsive to the reflected waves of the modulated frequency. The receiver response depends upon the carrier wave directly applied and the wave of modulated frequency which is detected after reflection from an object.

It has been previously proposed to measure the distance of an object from a given position by transmitting a short pulse of wave energy. The wave may be of radio or supersonic frequency. The pulses are transmitted at intervals which permit the wave to travel to the most distant object and back to the receiver before a succeeding pulse is radiated. In general, the distance measuring indicator may be an oscillograph in which the time base corresponds to distance and in which the zero corresponds to the time when the pulse is radiated. In such devices, the radiated pulses are of high intensity and the receiver is made very sensitive whereby it may respond to a weak reflected pulse. There is a tendency of a sensitive receiver to overload and become blocked by the radiated pulses.

It is one of the objects of this invention to provide means in an object detector for overcoming some of the difficulties of the prior art devices by radiating a carrier of comparatively low amplitude and generating the pulse by frequency modulation which may also include amplitude modulation. There is less tendency of the frequency modulated carrier to overload the receiver. In some applications of the invention the carrier may be radiated without change of amplitude whereby the receiver may be adjusted so that it will not be responsive, except in a small degree, to the pulses of changed frequency. A magnetron oscillator is especially adapted to frequency and amplitude modulation and may therefore be used as the generator of the carrier and frequency modulated pulses.

The invention will be described by reference to the accompanying drawings in which:

Figure 1 is a schematic circuit diagram of one embodiment of the invention;

Figure 2 is a graph for illustrating the operation of the invention;

Figure 3 is a schematic circuit diagram of a magnetron oscillator; and

Figure 4 is a graph illustrating the operation of the magnetron.

Referring to Fig. 1, an oscillator 1 is connected by transmission line 3 to an antenna 5 which may include one or more reflectors 7. The oscillator is connected to a modulation source such as a pulse generator 9. The pulse generator is connected to a sweep generator 11. The output of the sweep generator is impressed upon two of the deflecting plates 13 of a cathode ray tube 15. A radio receiver 17, which includes an amplifier tuned to a combination frequency of the modulated and unmodulated carrier, is connected to the other pair of deflecting plates 19 of the cathode ray tube. The receiver input is connected to the oscillator through a filter 21 and to the antenna through a coupler and pre-selector 23.

The use of a common antenna for transmission and reception is not essential to the invention. While separate antennas may be used, the single arrangement described in the copending application Serial No. 184,354, filed January 11, 1938, by Wolff and Hershberger, entitled "Signaling system," which issued June 4, 1946, as Patent No. 2,401,717, is preferred. It should be understood that the pulse generator establishes pulses of short duration and synchronizes the sweep generator with these pulses. The pulse generator modulates the oscillator to change its frequency and amplitude of oscillation.

The operation of the device will be explained by reference to Fig. 2 in which no attempt has been made to indicate exactly frequency or time. The unmodulated carrier is represented by reference numeral 25. At intervals the carrier is modulated in amplitude and frequency as represented by the reference numeral 27. The thus modulated carrier is directly radiated from the antenna. The carrier is applied through the filter to the receiver. The filter tends to eliminate the modulated carrier 27 and passes the unmodulated carrier 25 without attenuation. However, the modulated pulses will shock excite the receiver and cause a slight response which is not entirely undesirable as it serves to indicate the initial or zero position. The shock excited pulses are indicated by the reference numeral 29. At some interval of time after the radiation of the modulated pulse, reflections represented by reference numerals 31, 33 will appear at the receiver along with the carrier 25 but since the carrier is rejected by the preselector 23, only the reflected waves of the modulated carrier frequency will be applied to the radio receiver 17. The currents of the carrier frequency 25 and the modulated reflected carrier 31 are combined in the receiver to form a current of a frequency which is equal to the combination frequency of the modulated and unmodulated carrier and which may be amplified and demodulated. The combined currents and the impulse currents are indicated by the reference numerals 35, 37 and 39, respectively. The demodulated impulses which are applied to the cathode ray tube are indicated by the reference numerals 41, 43, 45 which indicate, respectively, the initial pulse or zero position, a reflection 43 of large amplitude from a comparatively nearby object, and a reflection 45 of small amplitude from an object located at a still greater distance.

The magnetron oscillator which is shown in Fig. 3 may be any of the well-known types of magnetron oscillator. The pulses from the pulse generator are applied to the anode circuit of the magnetron whereby either the frequency or the amplitude or both frequency and amplitude of the magnetron oscillations may be varied. One type of magnetron modulation characteristic is graphically illustrated in Fig. 4.

Thus the invention has been described as an object detector in which a carrier, preferably of low amplitude, is radiated. The carrier is frequency modulated at intervals by discrete pulses which may also vary the amplitude of the carrier. The unmodulated carrier is applied to a radio receiver where the carrier combines with the reflecting object may be determined. It should be understood that the radiation may currents are indicated on the cathode ray tube along a distance scale whereby the distance of the reflecting object may be made determined. It should be understood that the radiation may be made directive whereby the direction of the reflecting object may be determined. The invention is not limited to any specific pulse generator, sweep generator, oscillator or radio receiver. For example, the sweep generator may have a sawtooth or sine wave form. The oscillator, while preferably a magnetron, may be a triode or Barkhausen-Kurz. The radio receiver may be of any of the known types.

I claim as my invention:

1. In an object detector, the combination of means for radiating a carrier wave, means for frequency modulating said wave for discrete periods, means for receiving said frequency modulated carrier after reflection, means for passing currents of said carrier wave frequency directly to said receiving means, means associated with said last mentioned means for attenuating currents of frequencies other than said passing frequency, means for combining currents corresponding to said received modulated carrier and said directly applied currents, and means for indicating said combined currents.

2. An object detector including, in combination, a source of oscillations of carrier frequency, means for frequency modulating said carrier at intervals by discrete pulses, means for radiating said frequency modulated carrier, means for receiving reflections of said frequency modulated carrier, means for applying said carrier to said means for receiving, means associated with said last-mentioned means for attenuating currents of frequencies other than said applied carriers, means for combining in said receiving means currents corresponding to said reflected frequency modulated carrier and currents corresponding to said carrier, and means for indicating said combined currents.

IRVING WOLFF.

REFERENCES CITED

The following references are of record in the file of this patent:

UNITED STATES PATENTS

| Number | Name | Date |
|---|---|---|
| 1,924,174 | Wolf | Aug. 29, 1933 |
| 1,988,020 | Reiber | Jan. 15, 1935 |
| 2,045,072 | Espenschied | Jun. 23, 1936 |
| 2,050,418 | Boerner | Aug. 11, 1936 |
| 2,099,300 | Fritz | Nov. 16, 1937 |

FOREIGN PATENTS

| Number | Country | Date |
|---|---|---|
| 809,012 | France | Nov. 24, 1936 |